US011965695B2

(12) United States Patent
Xu et al.

(10) Patent No.: US 11,965,695 B2
(45) Date of Patent: Apr. 23, 2024

(54) CLOSED VARIABLE-FREQUENCY HEAT PUMP DRYING DEVICE WITH HEAT REGENERATOR AND CONTROL METHOD THEREOF

(71) Applicant: SHUNDE POLYTECHNIC, Guangdong (CN)

(72) Inventors: Yansheng Xu, Guangdong (CN); Zhijiang Wu, Guangdong (CN); Da Feng, Guangdong (CN); Huaxing Liu, Guangdong (CN); Xiyu Li, Guangdong (CN); Dongming Li, Guangdong (CN)

(73) Assignee: SHUNDE POLYTECHNIC, Foshan (CN)

( * ) Notice: Subject to any disclaimer, the term of this patent is extended or adjusted under 35 U.S.C. 154(b) by 552 days.

(21) Appl. No.: 17/209,489

(22) Filed: Mar. 23, 2021

(65) Prior Publication Data

US 2021/0293481 A1 Sep. 23, 2021

(51) Int. Cl.

| | |
|---|---|
| ***F26B 21/08*** | (2006.01) |
| ***F25B 30/02*** | (2006.01) |
| ***F25B 40/06*** | (2006.01) |
| ***F25B 41/30*** | (2021.01) |

(52) U.S. Cl.

CPC .............. *F26B 21/08* (2013.01); *F25B 30/02* (2013.01); *F25B 40/06* (2013.01); *F25B 41/30* (2021.01)

(58) Field of Classification Search

CPC ........ F26B 21/08; F26B 21/002; F26B 21/04; F26B 21/10; F26B 21/086; F26B 21/12; F25B 30/02; F25B 40/06; F25B 41/30

USPC ............................................................ 34/557

See application file for complete search history.

(56) References Cited

U.S. PATENT DOCUMENTS

2014/0033561 A1* 2/2014 Bison .................... F26B 23/005 34/75
2021/0115619 A1* 4/2021 Dunn .................... D06F 58/206
2022/0307710 A1* 9/2022 Carlsson .............. F24F 11/0008

FOREIGN PATENT DOCUMENTS

CN 201919594 U 8/2011
CN 204478763 U 7/2015
CN 109442889 A 3/2019

* cited by examiner

*Primary Examiner* — John P McCormack

(57) ABSTRACT

A closed variable-frequency heat pump drying device with a heat regenerator includes a variable-frequency compressor, a condenser, a throttling valve, an evaporator, a heat regenerator, a three-way valve, a variable-frequency fan, an air inlet temperature sensor, an air inlet humidity sensor, a drying bin, an air outlet temperature sensor, an air outlet humidity sensor and a controller. The controller regulates frequency of the variable-frequency compressor by comparing magnitudes of actual and set air inlet temperatures; a ratio of a straight-through air volume to a regenerated air volume of the three-way valve by comparing magnitudes of actual and set air inlet humidity; and frequency of the variable-frequency fan by comparing magnitudes of actual and set air humidity difference and magnitudes of actual and set air temperature difference of medium air entering and exiting the drying bin.

3 Claims, 1 Drawing Sheet

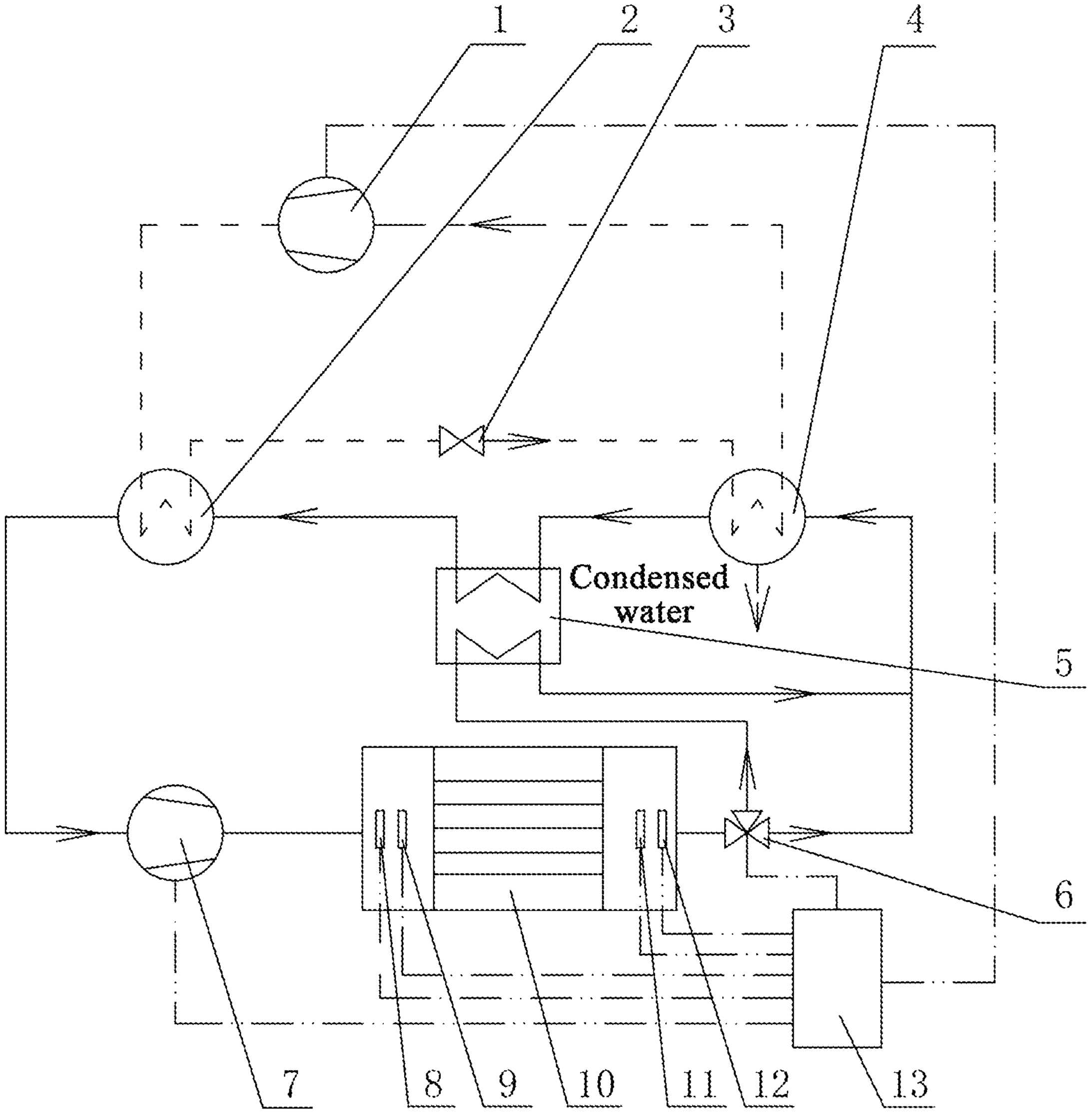
1
2
3
4
Condensed water
5
6
7
8
9
10
11
12
13

CLOSED VARIABLE-FREQUENCY HEAT PUMP DRYING DEVICE WITH HEAT REGENERATOR AND CONTROL METHOD THEREOF

TECHNICAL FIELD

The present invention relates to a closed variable-frequency heat pump drying device with a heat regenerator and a control method thereof, which relates to the field of energy conservation of a heat pump.

BACKGROUND OF THE PRESENT INVENTION

The heat pump drying technology has been widely used in the drying processing of food, agricultural products, etc. A notable feature in the drying processing of these products is that the heating load changes greatly during the entire processing. In addition, parameters (temperature and humidity of the medium air) of the drying process also have a greater impact on the drying rate and product quality.

At present, the heat pump drying device mainly adopts the fixed-frequency heat pump technology which has poor adaptability to the requirements of the drying process. Not only the drying rate and product quality are difficult to meet the design requirements, but also the energy consumption of the drying device is relatively high. For this reason, the variable-frequency heat pump drying technology with good heating load regulation capacity has been used gradually. Although variable-frequency heat pumps solve the problem of heating load regulation, how to better satisfy the set process parameters and how to realize the energy-saving operation of the device still require the optimized control of the system. In a closed variable-frequency heat pump drying device, the temperature of the medium air is controlled generally by regulating the frequency of a variable-frequency compressor. The humidity of the circulating air is controlled by regulating the frequency of a variable-frequency fan. In this way, although the set process parameters can be guaranteed, the air volume of the circulating air may be too large or too small. When the air volume is too large, not only the power of the fan is increased, but also the energy consumption of the heat pump system may be increased. When the air volume is too small, the drying rate and homogeneity of materials in a drying bin are poor. In addition, some researchers have proposed the heat regeneration technology to further realize the energy conservation of the drying device, but the process parameters are still difficult to be controlled. Therefore, it is necessary to further improve a closed variable-frequency heat pump drying device to realize the efficient energy conservation of the drying device.

SUMMARY OF THE PRESENT INVENTION

A purpose of the present invention is to overcome the shortcomings of the prior art and provide a closed variable-frequency heat pump drying device with a heat regenerator and a control method thereof. A control system can automatically regulate compressor frequency and fan frequency of the drying device and a ratio of the straight-through air volume to regenerated air volume in the air at an outlet of a drying bin according to the requirement for setting parameters of a drying process. The drying device realizes the energy-saving operation in a case of satisfying the parameter conditions of the drying process.

To achieve the above purpose, the technical solution of the closed variable-frequency heat pump drying device with the heat regenerator is realized as follows: the closed variable-frequency heat pump drying device with the heat regenerator includes a variable-frequency compressor, a condenser, a throttling valve, an evaporator, a heat regenerator, a three-way valve, a variable-frequency fan, an air inlet temperature sensor, an air inlet humidity sensor, a drying bin, an air outlet temperature sensor, an air outlet humidity sensor and a controller, wherein The air inlet temperature sensor and the air inlet humidity sensor both are installed at an inlet of the drying bin to sense air inlet temperature $T_1$ and air inlet humidity $\varphi_1$ at the inlet of the drying bin. The air outlet temperature sensor and the air outlet humidity sensor both are installed at an outlet of the drying bin to sense the air outlet temperature $T_2$ and the air outlet humidity $\varphi_2$ at the outlet of the drying bin.

The variable-frequency compressor, the condenser, the throttling valve and the evaporator are connected in series in sequence to form a heat pump system. An outlet of the heat regenerator faces one side of the condenser, and another outlet of the heat regenerator faces one side of the evaporator. An inlet of the heat regenerator faces the other side of the evaporator, and another inlet of the heat regenerator is communicated with an outlet of the three-way valve. Another outlet of the three-way valve faces the other side of the evaporator, and an inlet of the three-way valve is communicated with the outlet of the drying bin. An inlet of the variable-frequency fan faces the other side of the condenser, and an outlet of the variable-frequency fan is communicated with the inlet of the drying bin. Condensed water of the evaporator is directly discharged outside through a pipeline.

The controller is electrically connected with the variable-frequency compressor, the three-way valve, the variable-frequency fan, the air inlet temperature sensor, the air inlet humidity sensor, the air outlet temperature sensor and the air outlet humidity sensor respectively.

To achieve the above purpose, the technical solution of a control method of the closed variable-frequency heat pump drying device with the heat regenerator is realized as follows. The control method includes the following steps:

(I) setting parameters of a drying process in a controller, i.e. set air inlet temperature $T_0$ and set air inlet humidity $\varphi_0$ of medium air of the drying bin, and set air humidity difference $\Delta\varphi'$ and set air temperature difference $\Delta T'$ of the medium air entering and exiting the drying bin;

(II) measuring, by the controller, the actual air inlet temperature $T_1$ at the inlet of the drying bin through the air inlet temperature sensor, and comparing magnitudes of the actual air inlet temperature $T_1$ and set air inlet temperature $T_0$ to regulate the frequency of the variable-frequency compressor;

(III) measuring, by the controller, the actual air inlet humidity $\varphi_1$ at the inlet of the drying bin through the air inlet humidity sensor, and comparing magnitudes of the actual air inlet humidity epi and set air inlet humidity $\varphi_0$ to regulate a ratio of the straight-through air volume to regenerated air volume of the three-way valve;

(IV) regulating, by the controller, the frequency of the variable-frequency fan by comparing the actual air humidity change value $\Delta\varphi(\Delta\varphi=\varphi_1-\varphi_2)$ of the medium air entering and exiting the drying bin and the set air humidity difference $\Delta\varphi'$ and comparing the actual air temperature change value $\Delta T(\Delta T=T_1-T_2)$ and the set air temperature difference $\Delta T'$, wherein in the regulation process, a deviation between $\Delta T$ and $\Delta T'$ is used as a limit control parameter, and a deviation between $\Delta\varphi$ and $\Delta\varphi'$ is used as a process control parameter, that is, in the regulation process: (i) in a case of $\Delta T<\Delta T'$, when $\Delta\varphi<\Delta\varphi'$, the frequency of the variable-frequency fan is reduced, and when $\Delta\varphi>\Delta\varphi'$, the frequency of the variable-frequency fan is increased; and (ii) once in a case of $\Delta T\geq\Delta T'$, the frequency of the variable-frequency fan is increased to realize $\Delta T<\Delta T'$.

In the present technical solution, a set range of the set air humidity difference $\Delta\varphi'$ is from −10% to −60%. In the entire drying process, the set air humidity difference $\Delta\varphi'$ may be a fixed value and may also be different values at different drying phases, which is a fixed value of −40% in the present embodiment. A set range of the set air temperature difference $\Delta T'$ is 1° C-15° C. In the entire drying process, the set air temperature difference $\Delta T'$ may be a fixed value and may also be different values at different drying phases, which is a fixed value of 5° C. in the present embodiment.

Compared with the prior art, the present invention has the following advantages:

By adopting the heat regeneration technology, the energy conservation of the heat pump system can be better realized. By regulating the ratio of the straight-through air volume to the regenerated air volume in the air at the outlet of the drying bin, the air humidity at the inlet of the drying bin of the drying device can be effectively controlled. The variable-frequency fan can regulate the air volume according to the drying load, and the energy consumption of the fan and the heat pump system can be reduced effectively. Therefore, the efficient energy conservation of the drying device can be realized in a case of satisfying the parameter conditions of the drying process.

BRIEF DESCRIPTION OF THE DRAWINGS

FIG. 1 is a system schematic diagram of a closed variable-frequency heat pump drying device with a heat regenerator according to an embodiment of the present invention.

DETAILED DESCRIPTION OF THE PRESENT INVENTION

Embodiments of the present invention are described below in detail. Examples of the embodiments are shown in the drawings. The embodiments described below with reference to the drawings are exemplary and are only used to explain the present invention, but should not be construed as limiting the present invention.

As shown in FIG. 1, a closed variable-frequency heat pump drying device with a heat regenerator includes a variable-frequency compressor 1, a condenser 2, a throttling valve 3, an evaporator 4, a heat regenerator 5, a three-way valve 6, a variable-frequency fan 7, an air inlet temperature sensor 8, an air inlet humidity sensor 9, a drying bin 10, an air outlet temperature sensor 11, an air outlet humidity sensor 12 and a controller 13.

The air inlet temperature sensor 8 and the air inlet humidity sensor 9 both are installed at an inlet of the drying bin 10 to sense air inlet temperature $T_1$ and air inlet humidity $\varphi_1$ at the inlet of the drying bin 10. The air outlet temperature sensor 11 and the air outlet humidity sensor 12 both are installed at an outlet of the drying bin 10 to sense the air outlet temperature $T_2$ and the air outlet humidity $\varphi_2$ at the outlet of the drying bin 10.

The variable-frequency compressor 1, the condenser 2, the throttling valve 3 and the evaporator 4 are connected in series in sequence to form a heat pump system. An outlet of the heat regenerator 5 faces one side of the condenser 2, and another outlet of the heat regenerator 5 faces one side of the evaporator 4. An inlet of the heat regenerator 5 faces the other side of the evaporator 4, and another inlet of the heat regenerator 5 is communicated with an outlet of the three-way valve 6. Another outlet of the three-way valve 6 faces the other side of the evaporator 4, and an inlet of the three-way valve 6 is communicated with the outlet of the drying bin 10. An inlet of the variable-frequency fan 7 faces the other side of the condenser 2, and an outlet of the variable-frequency fan 7 is communicated with the inlet of the drying bin 10. Condensed water of the evaporator 4 is directly discharged outside through a pipeline.

The controller 13 is electrically connected with the variable-frequency compressor 1, the three-way valve 6, the variable-frequency fan 7, the air inlet temperature sensor 8, the air inlet humidity sensor 9, the air outlet temperature sensor 11 and the air outlet humidity sensor 12 respectively.

When in work, a refrigerant enters the condenser 2 through the variable-frequency compressor 1, exchanges heat with medium air in the condenser 2 and is condensed into liquid. The liquid refrigerant enters the evaporator 4 after being throttled by the throttling valve 3, exchanges heat with the medium air in the evaporator 4 and is evaporated into gas and then returns to the compressor 1. In this process, the medium air is dehumidified and cooled by the evaporator 4 (the condensed water is directly discharged) and then enters the heat regenerator 5 to exchange heat with the regenerated air from the outlet air of the drying bin 10, and the medium air enters the condenser 2 after being wet heated to exchange heat with the refrigerant of the heat pump system. The medium air after being wet heated is sent by the variable-frequency fan 7 to the drying bin 10 and exchanges heat and humidity with the dried materials in the drying bin 10, and the materials are dried gradually. The outlet air of the drying bin is divided by the three-way valve 6 into two paths, i.e. straight-through air and regenerated air. The regenerated air enters the heat regenerator 5 to exchange heat with the medium air from the evaporator 4, and the regenerated air is mixed with the air from the straight-through branch via the three-way valve 6 after being wet cooled, and the mixed air enters the evaporator 4 to be dehumidified and cooled.

In the present embodiment, to realize the efficient and energy-saving operation of the closed variable-frequency heat pump drying device with the heat regenerator, a control method includes the following steps:

(I) setting parameters of a drying process in a controller 13, i.e. set air inlet temperature $T_0$ and set air inlet humidity $\varphi_0$ of medium air of a drying bin 10, and set air humidity difference $\Delta\varphi'$ and set air temperature difference $\Delta T'$ of the medium air entering and exiting the drying bin 10;

(II) measuring, by the controller 13, the actual air inlet temperature $T_1$ at an inlet of the drying bin 10 through an air inlet temperature sensor 8, and comparing magnitudes of the actual air inlet temperature $T_1$ and set air inlet temperature $T_0$ to regulate the frequency of the variable-frequency compressor 1;

(III) measuring, by the controller 13, the actual air inlet humidity epi at the inlet of the drying bin 10 through the air inlet humidity sensor 9, and comparing magnitudes of the actual air inlet humidity $\varphi_1$ and set air inlet humidity $\varphi_0$ to regulate a ratio of straight-through air volume and regenerated air volume of a three-way valve 6;

(IV) regulating, by the controller 13, the frequency of the variable-frequency fan 7 by comparing the actual air humidity change value $\Delta\varphi(\Delta\varphi=\varphi_1-\varphi_2)$ of the medium air entering and exiting the drying bin 10 and the set air humidity difference $\Delta\varphi'$ and comparing the actual air temperature change value $\Delta T(\Delta T=T_1-T_2)$ and the set air temperature difference $\Delta T'$, wherein in the regulation process, a deviation between $\Delta T$ and $\Delta T'$ is used as a limit control parameter, and a deviation between $\Delta\varphi$ and $\Delta\varphi'$ is used as a process control parameter, that is, in the regulation process: (i) in a case of $\Delta T<\Delta T'$, when $\Delta\varphi<\Delta\varphi'$, the frequency of the variable-frequency fan 7 is reduced, and when $\Delta\varphi>\Delta\varphi'$, the frequency of the variable-frequency fan 7 is increased; and (ii) once in a case of $\Delta T>\Delta T'$, the frequency of the variable-frequency fan 7 is increased to realize $\Delta T<\Delta T'$.

In the present embodiment, a set range of the set air humidity difference $\Delta\varphi'$ is from −10% to −60%. In the entire drying process, the set air humidity difference $\Delta\varphi'$ may be a fixed value and may also be different values at different drying phases, which is a fixed value of −40% in the present embodiment. A set range of the set air temperature difference $\Delta T'$ is 1° C.-15° C. In the entire drying process, the set air temperature difference $\Delta T'$ may be a fixed value and may also be different values at different drying phases, which is a fixed value of 5° C. in the present embodiment.

Although the embodiments of the present invention have been shown and described, those ordinary skilled in the art can understand that various changes, modifications, substitutions and variations can be made to these embodiments without departing from the principle and purpose of the present invention. The scope of the present invention is defined by the claims and their equivalents.

We claim:

1. A closed variable-frequency heat pump drying device with a heat regenerator, comprising a variable-frequency compressor (1), a condenser (2), a throttling valve (3), an evaporator (4), a heat regenerator (5), a three-way valve (6), a variable-frequency fan (7), an air inlet temperature sensor (8), an air inlet humidity sensor (9), a drying bin (10), an air outlet temperature sensor (11), an air outlet humidity sensor (12) and a controller (13), wherein the air inlet temperature sensor (8) and the air inlet humidity sensor (9) both are installed at an inlet of the drying bin (10) to sense air inlet temperature $T_1$ and air inlet humidity $\varphi_1$ at the inlet of the drying bin (10); the air outlet temperature sensor (11) and the air outlet humidity sensor (12) both are installed at an outlet of the drying bin (10) to sense the air outlet temperature $T_2$ and the air outlet humidity $\varphi_2$ at the outlet of the drying bin (10);

the variable-frequency compressor (1), the condenser (2), the throttling valve (3) and the evaporator (4) are connected in series in sequence to form a heat pump system; an outlet of the heat regenerator (5) faces one side of the condenser (2), and another outlet of the heat regenerator (5) faces one side of the evaporator (4); an inlet of the heat regenerator (5) faces the other side of the evaporator (4), and another inlet of the heat regenerator (5) is communicated with an outlet of the three-way valve (6); another outlet of the three-way valve (6) faces the other side of the evaporator (4), and an inlet of the three-way valve (6) is communicated with the outlet of the drying bin (10); an inlet of the variable-frequency fan (7) faces the other side of the condenser (2), and an outlet of the variable-frequency fan (7) is communicated with the inlet of the drying bin (10); and condensed water of the evaporator (4) is directly discharged outside through a pipeline; and the controller (13) is electrically connected with the variable-frequency compressor (1), the three-way valve (6), the variable-frequency fan (7), the air inlet temperature sensor (8), the air inlet humidity sensor (9), the air outlet temperature sensor (11) and the air outlet humidity sensor (12) respectively.

2. A control method of the closed variable-frequency heat pump drying device with the heat regenerator of claim 1, comprising the following steps:

(I) setting parameters of a drying process in a controller (13), i.e. set air inlet temperature $T_0$ and set air inlet humidity $\varphi_0$ of medium air of the drying bin (10), and set air humidity difference $\Delta\varphi'$ and set air temperature difference $\varphi T'$ of the medium air entering and exiting the drying bin (10);

(II) measuring, by the controller (13), the actual air inlet temperature $T_1$ at the inlet of the drying bin (10) through the air inlet temperature sensor (8), and comparing magnitudes of the actual air inlet temperature $T_1$ and set air inlet temperature $T_0$ to regulate the frequency of the variable-frequency compressor (1);

(III) measuring, by the controller (13), the actual air inlet humidity $\varphi_1$ at the inlet of the drying bin (10) through the air inlet humidity sensor (9), and comparing magnitudes of the actual air inlet humidity $\varphi_1$ and set air inlet humidity $\varphi_2$ to regulate a ratio of the straight-through air volume to regenerated air volume of the three-way valve (6); and (IV) regulating, by the controller (13), the frequency of the variable-frequency fan (7) by comparing the actual air humidity change value $\Delta\varphi(\Delta\varphi=\varphi_1-\varphi_2)$ of the medium air entering and exiting the drying bin (10) and the set air humidity difference $\Delta\varphi'$ and comparing the actual air temperature change value $\Delta T(\Delta T=T_1-T_2)$ and the set air temperature difference $\Delta T'$, wherein in the regulation process, a deviation between $\Delta T$ and $\Delta T'$ is used as a limit control parameter, and a deviation between $\Delta\varphi$and $\Delta\varphi'$ is used as a process control parameter, that is, in the regulation process: (i) if $\Delta T<\Delta T'$, when $\Delta\varphi<\Delta\varphi'$, the frequency of the variable-frequency fan (7) is reduced, and when $\Delta\varphi>\Delta\varphi'$, the frequency of the variable-frequency fan (7) is increased; and (ii) if $\Delta T>\Delta T'$, the frequency of the variable-frequency fan (7) is increased to realize $\Delta T<\Delta T'$.

3. The control method of the closed variable-frequency heat pump drying device with the heat regenerator according to claim 2, wherein a set range of the set air humidity difference $\Delta\varphi'$ is from −10% to −60%; in the entire drying process, the set air humidity difference $\Delta\varphi'$ is a fixed value or has different values at different drying phases, which is a fixed value of −40%; a set range of the set air temperature difference $\Delta T'$ is 1° C.-15° C.; and in the entire drying process, the set air temperature difference $\Delta T'$ is a fixed value or has different values at different drying phases, which is a fixed value of 5° C.

* * * * *